E. V. R. GARDNER.
Horse Hay-Fork.
No. 198,101. Patented Dec. 11, 1877
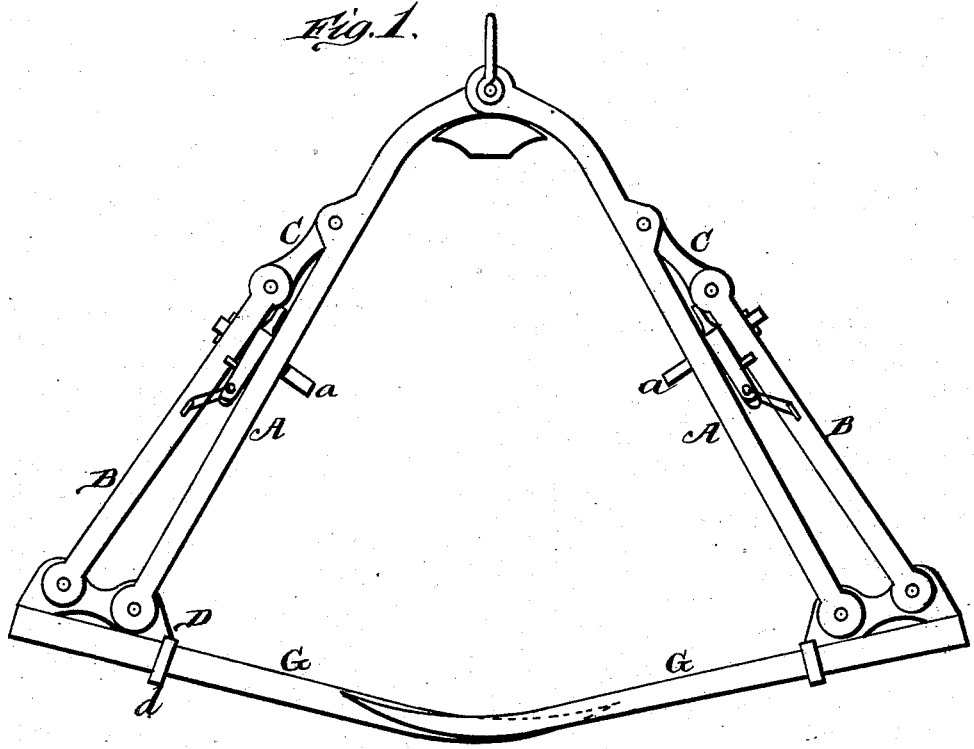
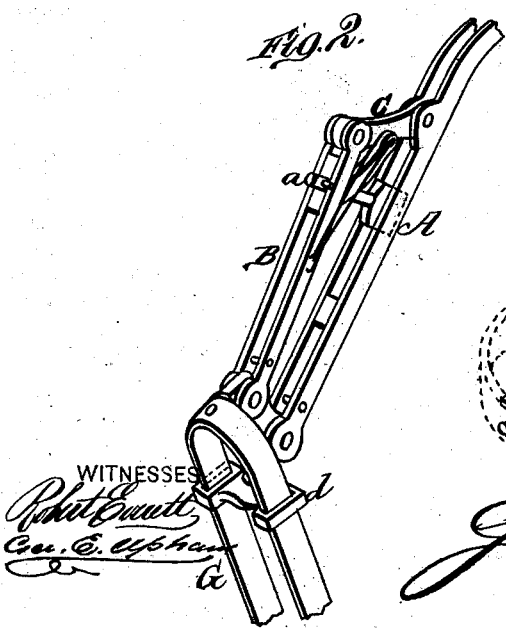
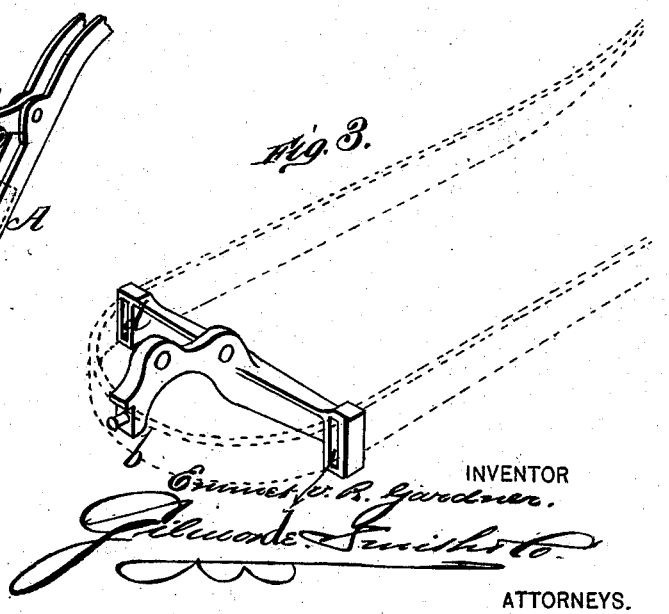
WITNESSES
INVENTOR
ATTORNEYS.

UNITED STATES PATENT OFFICE.

EMMET V. R. GARDNER, OF JOHNSON'S, NEW YORK.

IMPROVEMENT IN HORSE HAY-FORKS.

Specification forming part of Letters Patent No. 198,101, dated December 11, 1877; application filed November 17, 1877.

To all whom it may concern:

Be it known that I, EMMET V. R. GARDNER, of Johnson's, in the county of Orange and State of New York, have invented a new and valuable Improvement in Horse Hay-Forks; and I do hereby declare that the following is a full, clear, and exact description of the construction and operation of the same, reference being had to the annexed drawings, making a part of this specification, and to the letters and figures of reference marked thereon.

Figure 1 of the drawings is a side view of my horse hay-fork, and Figs. 2 and 3 are perspective details of the same.

My invention relates to improvements upon the horse hay-fork for which Letters Patent No. 161,404 were granted to me, March 30, 1875; and the nature of my invention consists in the construction of a cross-head or T-head with slots in the ends of its arms to receive the tines, and a rest on the top to secure the tine in its place, and also in the construction of the tines, all as hereinafter more fully set forth.

The annexed drawing, to which reference is made, fully illustrates my invention.

A A represent the slotted arms, pivoted together at their upper ends. B B and C C are the links, and a a the arrow-head catches, all substantially the same as in my former patent above referred to.

In the lower end of each arm A is pivoted the center arm or standard of T-shaped cross-head D. The lower end of the link B is also pivoted to this arm at a point outside of the pivot of the arm A.

The ends of the side arms of the cross-head D are formed with slots at d, to receive the tines G. Upon the end of the center arm or standard of the cross-head is formed a rest, b, with hole for a rivet or bolt to secure the tine in its place.

The tines G G for each side of the hay-fork are made of one piece of metal, bent in semi-circular form in the center, and the ends or tines curved or formed in any suitable shape. The tines G G are slipped through the slots d in the ends of the cross-head, and held in position by a rivet or bolt through the rest b and the center of the tines. By this means the strain comes edgewise on the arms of the cross-head, and edgewise on the fork-tines. At the same time the tines are so supported that they cannot bend or break, which is the main object of my present invention.

What I claim as new, and desire to secure by Letters Patent, is—

1. The T-shaped cross-head D, formed with the slots d d and rest b, substantially as and for the purposes herein set forth.

2. The combination of the cross-head D, provided with slots d d and rest b, and the tines G G, made of a single piece of metal bent in the center, substantially as and for the purposes herein set forth.

In testimony that I claim the above I have hereunto subscribed my name in the presence of two witnesses.

EMMET V. R. GARDNER.

Witnesses:
M. J. DONOVAN,
WM. H. STODDARD.